United States Patent [19]
Krajcik

[11] 3,750,254
[45] Aug. 7, 1973

[54] TRAILER HITCH INSTALLATION APPARATUS

[76] Inventor: Larry Lee Krajcik, 8921 W. Rohr Ave., Milwaukee, Wis. 53225

[22] Filed: May 3, 1971

[21] Appl. No.: 139,621

[52] U.S. Cl. .............................................. 29/200 P
[51] Int. Cl. ............................................ B23p 19/00
[58] Field of Search ...................... 29/200 J, 200 P, 29/200 R, 200 B

[56] References Cited
UNITED STATES PATENTS
2,680,287    6/1954   Wilson .............................. 29/200 J Primary Examiner—Thomas H. Eager
Attorney—Joseph P. Haase, Jr.

[57] ABSTRACT

A device for installing trailer hitches. This device includes a telescoping sleeve combination mounted on legs with casters and the upper extremity includes a table with an adjustable bar, the table being elevated by hydraulic jack means.

3 Claims, 3 Drawing Figures

PATENTED AUG 7 1973

3,750,254

INVENTOR.
LARRY L. KRAJCIK

TRAILER HITCH INSTALLATION APPARATUS

This invention relates to shop tools, and more particularly to a trailer hitch installation apparatus.

It is therefore the primary purpose of this invention to provide a hitch installation apparatus which will require only one person to install a hitch, the installation of the prior art was such that it required two persons.

Another object of this invention is to provide a hitch installation apparatus which will have radially spaced apart leg portions with casters, the leg members being secured fixedly to the lower extremity of an elongated sleeve which telescopingly receives a second sleeve to which is attached a table member.

Still another object of this invention is to provide a device of the type described which will have adjustable bar means on the table for positioning the hitch and the table will also include a spring-loaded universal joint so as to enable the table to be placed in any angular position required.

A further object of this invention is to provide a hitch installation apparatus which will include an adjustable bar member on the second sleeve which will serve to raise or lower said second sleeve by hydraulic jack means secured to the main sleeve.

Other objects of the present invention are to provide a hitch installation apparatus which is simple in design, inexpensive to manufacture, rugged in construction, easy to use and efficient in operation.

These and other objects will become readily evident upon a study of the following specification together with the accompanying drawing wherein.

Figure 1:
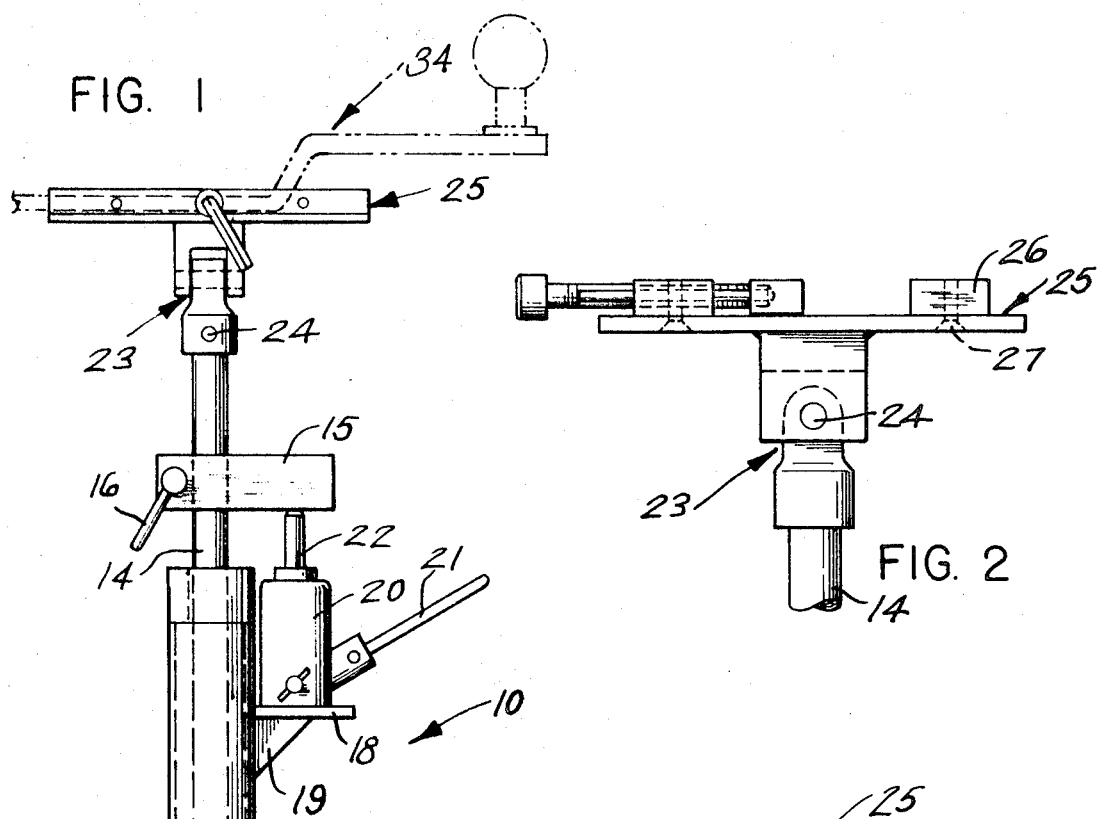
FIG. 1 is a side view of the present invention shown in elevation with the hitch shown in phantom lines.
Figure 2:
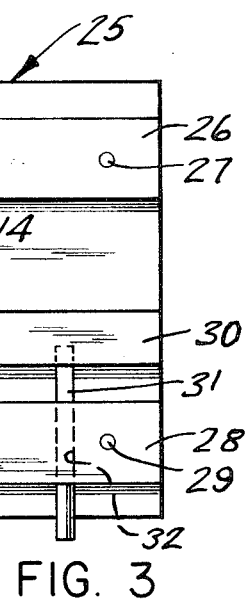
FIG. 2 is an end view of the upper table portion of the apparatus shown in elevation.
Figure 3:
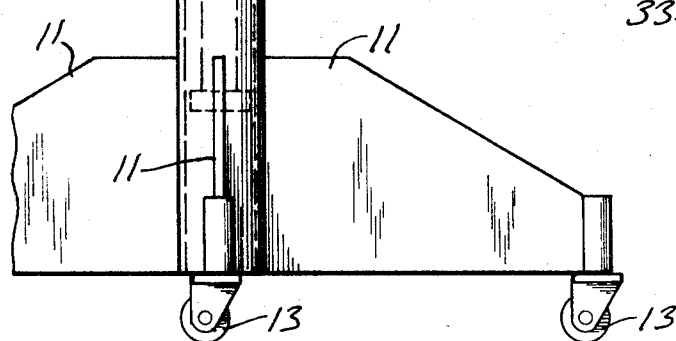
FIG. 3 is an enlarged top plan view of the table shown partly broken away.

According to this invention, a trailer hitch installation apparatus 10 is shown to include a plurality of radially spaced apart legs 11 having casters 13. Legs 11 are secured fixedly by welding to an elongated sleeve 12 which telescopingly receives a sleeve 14 which is received within a bar member 15. Bar member 15 is provided with a locking handle 16 secured to a bolt 17. Bar 15 may be secured at any desired point upon the telescoping sleeve 14. A plate 18 is secured fixedly to the outer periphery of sleeve 12 near the its upper extremity by welding and a gusset 19 is also secured to plate 18 and to the outer periphery of sleeve 12 to impart rigidity and strength in order to support a hydraulic jack 20 having an operating handle 21. The jack shaft 22 serves to urge against bar 15 in order to elevate the telescoping sleeve 14 to any desired height. A spring loaded universal joint 23 is secured by bolt fastener 24 to the upper extremity of sleeve 14 and is welded to a rectangular configurated table member 25. Secured fixedly to table 25 is a bar 26 secured to top of table 25 by means of a pair of fasteners 27. Parallel spaced apart from bar 26 is bar 28 which secured to top of table 25 by means of fasteners 29. Spaced intermediately between bars 26 and 28 is a slideable bar 30 from which extends a pair of parallel spaced apart guide pins 31 which will slideably receive within openings 32 of bar 28. A bolt 33 threadingly received within bar 28, provides adjustment means for the removable bar 30 in order to engage the hitch 34.

The apparatus 10 when in use is placed under the car and a jack 20 is operated by handle 21 to raise bar 15 secured to the telescoping sleeve 14. The sleeve 14 raised until it is firmly against the bottom of the car and the table 25 is pushed forward or rearwards depending upon the angle of the hitch 34 to be installed. Once the table 25 is properly positioned under the car, the jack 20 is then used to exert a small amount of pressure under the frame pushing the trailer hitch 34 firmly against the frame, after which the holes may be drilled without the hitch 34 moving around while doing so.

What I now claim is:

1. A trailer hitch installation apparatus, comprising a base portion, a plurality of radially spaced apart legs carried by said base with caster means for mobility, a main sleeve and a telescoping sleeve carried by said base for elevating a rectangular table member, an adjustable bar member carried by said base providing a means for lifting said table by hydraulic means, a universal joint carried by said telescoping sleeve, said joint providing angle adjustment for said table and adjustable bar means carried by said table for holding said hitch firmly so said hitch may be drilled without its moving around.

2. The combination according to claim 1, wherein said legs are fixedly secured to the lower extremity of said main sleeve and said bar is locked at any elevation point desired upon said telescoping sleeve by means of a handle secured fixedly to a bolt which opens or closes the open end of said bar and said bar extends and overhangs onto the hydraulic jack so that when said jack is operated will elevate said bar and said telescoping sleeve simultaneously to any desired height, said jack being secured fixedly to a plate welded to the outer periphery of said main sleeve.

3. The combination according to claim 2, wherein said universal joint is secured to the upper extremity of said telescoping sleeve above said bar secured thereto and is spring loaded and enables said table to be tilted at any angle desired, said table having a pair of parallel spaced apart bar members secured thereto by suitable fasteners and disposed between said bars of said table is a slideable bar member which is urged against said hitch to align it and hold it, said moveable bar having projecting and parallel pins, said pins being slideably received within openings through the second fixed bar of said table and said second fixed bar includes a threaded bolt which provides a means of urging said moveable bar towards said hitch.

* * * * *